(12) United States Patent
Butler et al.

(10) Patent No.: US 7,057,852 B1
(45) Date of Patent: Jun. 6, 2006

(54) DISK DRIVE INCLUDING SURFACE COATED DISK CLAMP SCREWS WITH REDUCED COEFFICIENT OF FRICTION FOR MITIGATING DISK CLAMP MOVEMENT

(75) Inventors: Walter W. Butler, Scotts Valley, CA (US); Yao-Hsin Huang, San Jose, CA (US); Robert E. Lloyd, Jr., Gilroy, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 247 days.

(21) Appl. No.: 10/286,147

(22) Filed: Oct. 31, 2002

(51) Int. Cl.
*G11B 17/02* (2006.01)
(52) U.S. Cl. .................................. 360/99.12
(58) Field of Classification Search ............. 360/98.08, 360/98.02, 85, 99.05, 99.12, 99.02; 264/211.21; 424/484; 118/726; 428/450; 30/267
See application file for complete search history.

(56) References Cited

U.S. PATENT DOCUMENTS

| | | | | |
|---|---|---|---|---|
| 3,672,053 A | * | 6/1972 | Wiss | 30/267 |
| 4,639,802 A | * | 1/1987 | Neubauer et al. | 360/98.08 |
| 4,945,432 A | * | 7/1990 | Matsudaira et al. | 360/98.02 |
| 5,218,492 A | * | 6/1993 | Miyamoto et al. | 360/85 |
| 5,569,429 A | * | 10/1996 | Luker | 264/211.21 |
| 5,891,253 A | * | 4/1999 | Wong et al. | 118/726 |
| 6,352,722 B1 | * | 3/2002 | Blair | 424/484 |
| 6,908,683 B1 | * | 6/2005 | Ohashi | 428/450 |
| 2002/0071205 A1 | * | 6/2002 | Koyanagi et al. | 360/98.08 |

FOREIGN PATENT DOCUMENTS

| | | | |
|---|---|---|---|
| JP | 08328547 A | * | 12/1996 |
| JP | 09259497 A | * | 10/1997 |

* cited by examiner

*Primary Examiner*—Tianjie Chen
(74) *Attorney, Agent, or Firm*—Stetina Brunda Garred & Brucker; Joshua C. Harrison, Esq.

(57) ABSTRACT

An aspect of the invention can be regarded as a disk drive that includes a disk drive base, a disk including disk surface, and a spindle motor including a spindle motor hub including a clamping surface with disk clamp holes. The disk drive includes a disk clamp disposed upon the disk surface. The disk clamp includes a screw head interface surface and screw openings. The disk drive includes disk clamp screws each including a shaft sized and configured to respectively engage the threaded disk clamp holes respectively through the screw openings. The screws each further include a screw head having a screw head clamping surface disposed against the screw head interface surface. The screws each further include a surface coating disposed upon the screw head clamping surface. The surface coating has a static coefficient of friction less than a static coefficient of friction of the screw head.

16 Claims, 3 Drawing Sheets

DISK DRIVE INCLUDING SURFACE COATED DISK CLAMP SCREWS WITH REDUCED COEFFICIENT OF FRICTION FOR MITIGATING DISK CLAMP MOVEMENT

BACKGROUND OF THE INVENTION

1. Cross-Reference to Related Applications

Not applicable.

2. Field of the Invention

The present invention relates generally to disk drives, and in particular to a disk drive including surface coated disk clamp screws with reduced coefficient of friction for mitigation disk clamp movement.

3. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA).

The head stack assembly has an actuator assembly having at least one head or slider, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. A disk clamp is affixed about the spindle motor hub. Fasteners, such as screws, are disposed through screw openings of the disk clamp and engage threaded disk clamp holes that are circumferentially spaced about a periphery of the spindle motor hub for applying a clamping force by the disk clamp against the topmost disk to secure all of the disks to the spindle motor hub.

The spindle motor typically includes a spindle motor base that is attached to the disk drive base. A shaft is coupled to the spindle motor base and the spindle motor hub surrounds the shaft. The spindle motor hub may be rotatably coupled to the shaft, and therefore the spindle motor base, typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

The various rotating elements associated with the disks may be referred to as a disk pack. This may include not only the disks, but also the rotating portions of the spindle motor, the spacers, the disk clamp and disk clamp screws. It is crucial that the mass of the disk pack is balanced so as to minimize dynamic vibrations during operation of the disk drive. The greater the magnitude of the imbalance, the greater the degradation of the disk drive performance, not only in terms of read/write errors, but also seek times. A significant amount of imbalance may even result in damage or excessive wear to various disk drive components.

A problem with balancing of the disk pack arises upon the final installation of the disk clamp screws. The torquing of the disk clamp screws may lead to a shifting of the disk clamp relative to rest of the disk pack. Such shifting of the disk clamp may result in a shifting of the location of the disks, resulting in a significant imbalance of the overall disk pack. In this regard, there is a need in the art for an improved disk drive including a disk clamping arrangement in comparison to the prior art.

SUMMARY OF THE INVENTION

An aspect of the invention can be regarded as a disk drive that includes a disk drive base, a rotatable disk including a disk surface, and a spindle motor rotatably coupled to the disk drive base for rotating the disk about an axis of rotation. The spindle motor includes a spindle motor hub including a clamping surface with a plurality of threaded disk clamp holes. The disk drive further includes a disk clamp disposed upon the disk surface about the spindle motor hub. The disk clamp includes a screw head interface surface and a plurality of screw openings formed through the disk clamp. The disk drive further includes a plurality of disk clamp screws. The screws each includes a shaft sized and configured to respectively engage the threaded disk clamp holes respectively through the screw openings. The screws each further includes a screw head having a screw head clamping surface disposed against the screw head interface surface. The screws each further include a surface coating disposed upon the screw head clamping surface. The surface coating has a static coefficient of friction less than a static coefficient of friction of the screw head for mitigating relative movement between the disk clamp and the axis of rotation of the spindle motor. According to various embodiments of the present invention, the surface coating may include a metallic material, such as nickel. The surface coating may further be polytetrafluoroethylene. The surface coating may further include a plastic material. The surface coating may be further disposed substantially about each of the disk clamp screws. The surface coating has a static coefficient of friction less than 0.6, such as about 0.2.

Another aspect of the invention can be regarded as method of mitigating disk shift relative to spindle motor axis of rotation during assembly of a disk drive. The method begins with providing a spindle motor having an axis of rotation. The spindle motor includes a spindle motor hub including a clamping surface with a plurality of threaded disk clamp holes. A disk is mounted about the spindle motor hub. The disk includes a disk surface. A disk clamp is mounted upon the disk surface about the spindle motor hub. The disk clamp includes a screw head interface surface and a plurality of screw openings formed through the disk clamp. Next, the disk clamp is attached to the spindle motor hub with a plurality of disk clamp screws. The screws each include a shaft sized and configured to respectively engage the threaded disk clamp holes respectively through the screw openings. The screws each further include a screw head having a screw head clamping surface disposed against the screw head interface surface. The screws each further include a surface coating disposed upon the screw head clamping surface. The surface coating has a static coefficient of friction less than a static coefficient of friction of the screw head for mitigating relative movement between the disk clamp and the axis of rotation of the spindle motor.

DESCRIPTION OF THE PREFERRED EMBODIMENTS

Figure 1:
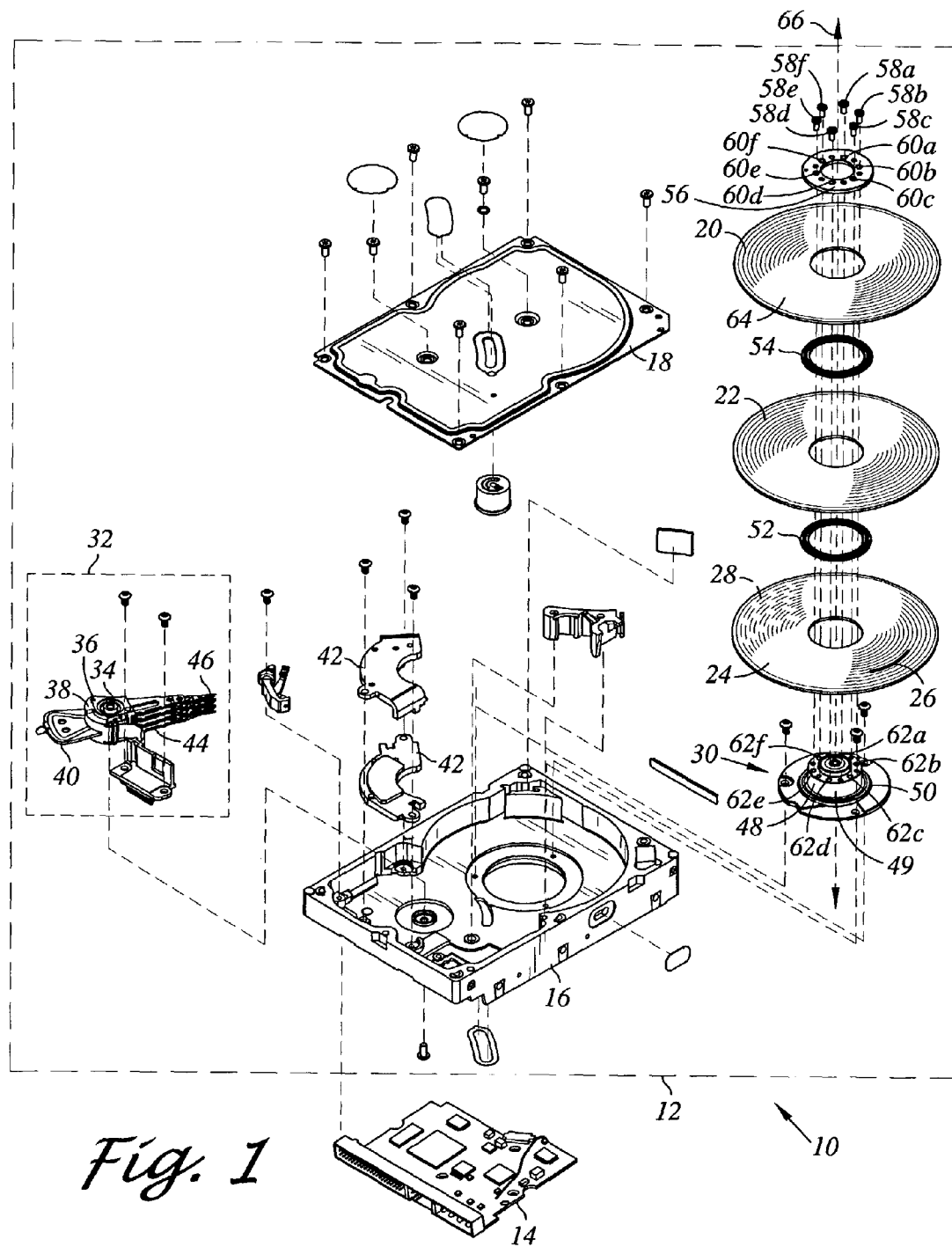
FIG. 1 is an exploded perspective view of a disk drive as constructed in accordance with aspects of the present invention.

Referring now to the drawings wherein the showings are for purposes of illustrating preferred embodiments of the present invention only, and not for purposes of limiting the same, FIGS. 1–4 illustrate a disk drive and a method of mitigating disk shift during fabrication of a disk drive in accordance with the aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 24 is shown having a track 26 on an upper facing side and a track 28 (shown in phantom) on a lower facing side. The head disk assembly 12 further includes a spindle motor 30 for rotating the magnetic disks 20, 22, 24. The head disk assembly 12 further includes a head stack assembly 32 and a pivot bearing cartridge 34. The head stack assembly 32 includes a rotary actuator 36.

The rotary actuator 36 includes an actuator body 38 that has a bore and the pivot bearing cartridge 34 engaged within the bore for facilitating the rotary actuator 36 to rotate between limited positions. The rotary actuator 36 further includes a coil portion 40 that extends from one side of the actuator body 38 to interact with a pair of permanent magnets 42 to form a voice coil motor for pivoting the rotary actuator 36. A plurality of actuator arms, the lowermost one of which being denoted 44, extend from an opposite side of the actuator body 38. As the disks 20, 22, 24 may be two sided, each of the actuator arms include either one or two head gimbal assemblies associated with the adjacent sides of the disks 20, 22, 24. Each head gimbal assembly includes a head (the uppermost one being denoted 46) for reading and writing data to and from the disks 20, 22, 24.

The spindle motor 30 includes a spindle motor hub 48 that is rotatably attached to the disk drive base 16. The spindle motor hub 48 has a hub body 49 and a hub flange 50 that extends from the hub body 49 to support a lowermost one of the disks, namely disk 24. The remaining disks 22, 20 are stacked and separated with annular disk spacers 52, 54 that are disposed about the hub body 49. A disk clamp 56 is attached about the spindle motor hub 48 and is utilized to apply a clamping force against the topmost disk 20 for securing all the disks 20, 22, 24 to the spindle motor hub 48.

The spindle motor 30 typically includes a spindle motor base that is attached to the disk drive base 12. A shaft is coupled to the spindle motor base and the spindle motor hub 48 surrounds the shaft. The spindle motor hub 48 may be rotatably coupled to the shaft and therefore the spindle motor base typically via a pair of bearing sets. A stator is positioned about the shaft and is attached to the spindle motor base. A magnet element is attached at bottom portion of the hub flange 50. The stator includes windings that selectively conduct current to create a magnetic field that interacts with the various poles of the magnet element. Such interaction results in forces applied to the spindle motor hub 48 that tend to rotate the spindle motor hub 48 and the attached disks 20, 22, 24.

An aspect of the invention can be regarded as the disk drive 10 that includes the disk drive base 16. The disk drive 10 further includes a disk, such as disk 20. The disk 20 includes a disk surface 64. The disk drive 10 further includes the spindle motor 30 rotatably coupled to the disk drive base 16 for rotating the disk 20 about an axis of rotation 66. The spindle motor 30 includes the spindle motor hub 48. The spindle motor hub 48 includes a clamping surface 74 with a plurality of threaded disk clamp holes 62a–f. The disk drive 10 further includes the disk clamp 56 disposed upon the disk surface 64 of the disk 20 about the spindle motor hub 48. The disk clamp 56 includes a screw head interface surface 76 and a plurality of screw openings 60a–f formed through the disk clamp 56. The disk drive 10 further includes a plurality of disk clamp screws 58-f. It is contemplated that a fewer or greater number of screws may be utilized.

Figure 2:
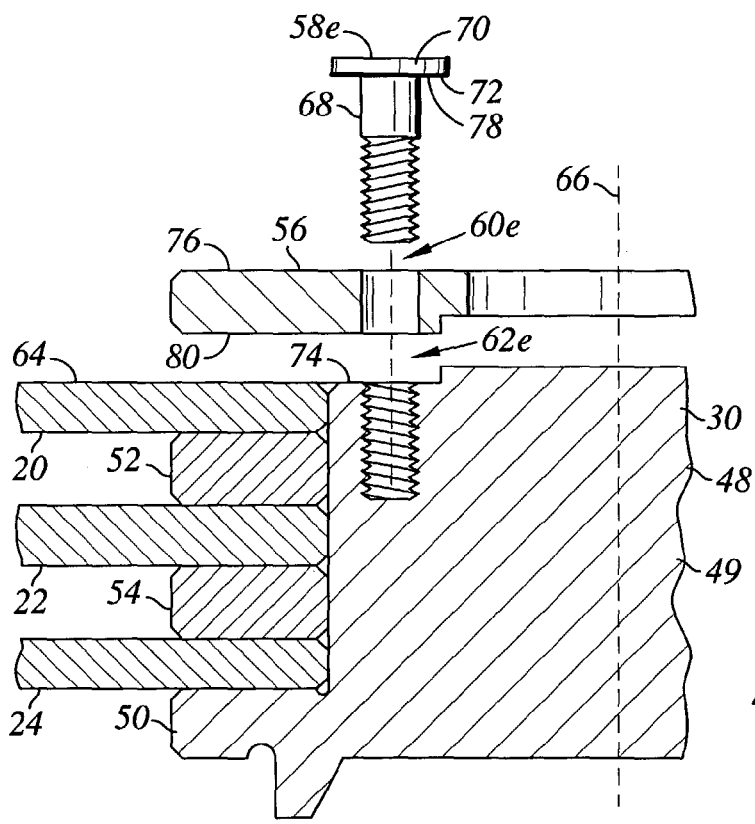
FIG. 2 is a cross-sectional view of a portion of a spindle motor hub and disks of the disk drive of FIG. 1 with a portion of a disk clamp and a coated disk clamp screw exploded way from the spindle motor hub.
Figure 3:
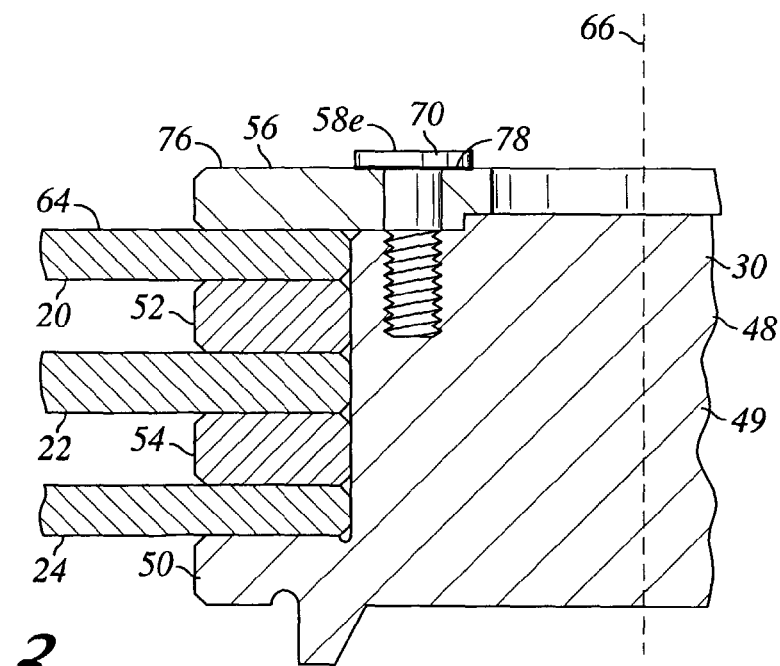
FIG. 3 is the cross-sectional view of FIG. 2 with the disk clamp and disk clamp screw assembled with the spindle motor hub and disks.
Figure 4:
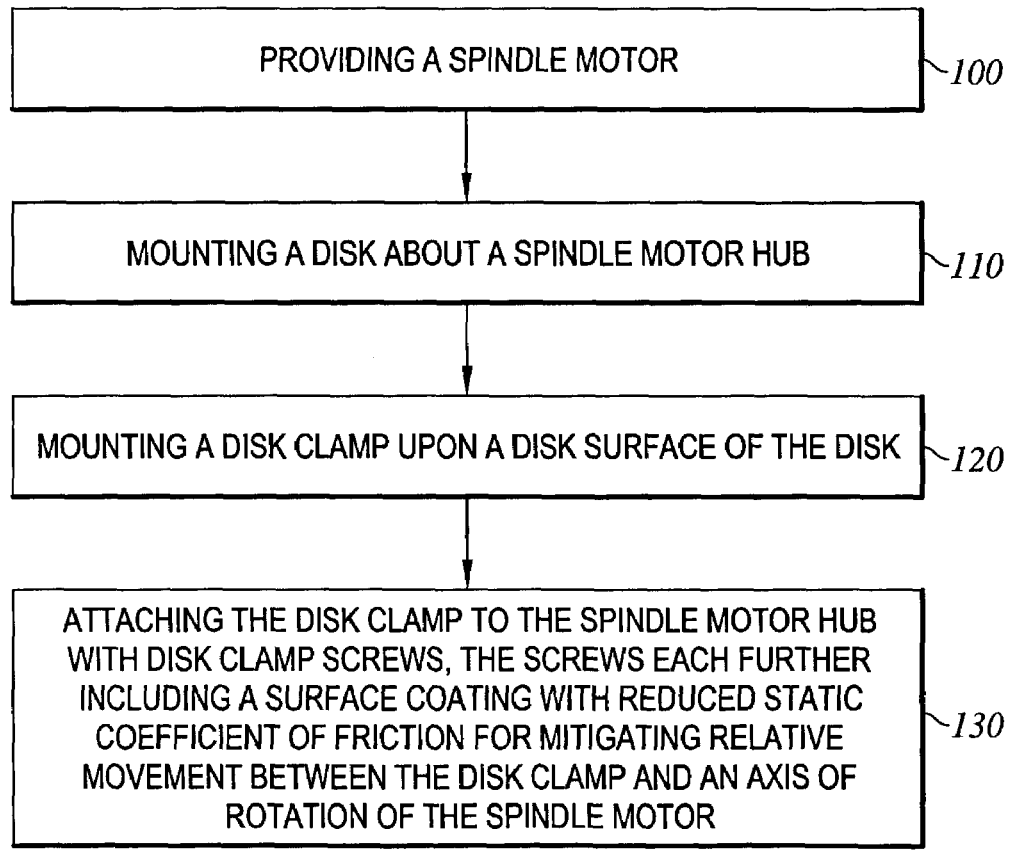
FIG. 4 is a flow diagram of a method of mitigating disk shift during fabrication of a disk drive according to aspects of the present invention.

Referring additionally to FIG. 2 there is depicted a cross-sectional view of a portion of the spindle motor hub 48 and disks 20, 22, 24 of the disk drive 10 of FIG. 1 with a portion of the disk clamp 56 shown which includes the screw opening 60e and the disk clamp screw 58e as exploded way from the spindle motor hub 48. FIG. 3 is the cross-sectional view of FIG. 2 with the disk clamp 56 and the disk clamp screw 58e assembled with the spindle motor hub 48 and disks 20, 22, 24. The screws 58a–f each includes a shaft 68 sized and configured to respectively engage the threaded disk clamp holes 62a–f respectively through the screw openings 60a–f. The screws 58a–f each further includes a screw head 70 having a screw head clamping surface 72 disposed against the screw head interface surface 76. The screws 58a–f each further include a surface coating 78 disposed upon the screw head clamping surface 72. The surface coating 78 has a static coefficient of friction less than a static coefficient of friction of the screw head 70 for mitigating relative movement between the disk clamp 56 and the axis of rotation 66 of the spindle motor 30.

As mentioned above, the surface coating 78 has a static coefficient of friction less than a static coefficient of friction of the screw head 70. In this regard for example, the screws 58a–f may be formed of a stainless steel material that may have a static coefficient of friction of about 0.6. In this example, the surface coating 78 would have a static coefficient of friction less than 0.6, such as about 0.2. According to various embodiments of the present invention, the surface coating 78 may include a metallic material, such as nickel. The surface coating may further be polytetrafluoroethylene. The surface coating may further include a plastic material. The surface coating may be further disposed substantially about each of the disk clamp screws 58a–f. For example, the screw 58a–f may be dipped in a material so as to form the surface coating 78.

It is contemplated that such reduced static coefficient of friction associated with the screw head clamping surface 72 reduces the friction with the screw head interface surface of the disk clamp 56. As such, movement of the disk clamp 56 may be mitigated. The disk clamp 56 may further include a disk interface surface 80 that is in contact with the disk surface 64. Mitigation of movement of the disk clamp 56 is contemplated to reduce friction between the disk interface surface 80 the disk 20, and thus mitigate a shifting of the disk 20 due to shifting of the disk clamp 56. Moreover, it is contemplated that because less applied torque is lost due to friction, the resultant clamp force load is increased.

Another aspect of the invention can be regarded as method of mitigating disk shift relative to the spindle motor axis of rotation 66 during assembly of a disk drive 10. Referring additionally to the flow diagram of FIG. 4, the method begins with the step 100 of providing the spindle motor 30 having the axis of rotation 66. The spindle motor 30 includes a spindle motor hub 48 including the clamping surface 74 with the plurality of threaded disk clamp holes 62a–f. Next, according to step 110, the disk 20 is mounted about the spindle motor hub 48. The disk 20 includes the disk surface 64. Step 120 provides for the disk clamp 56 being mounted upon the disk surface 64 about the spindle motor hub 48. The disk clamp 56 includes the screw head interface surface 76 and the plurality of screw openings 60a–f formed through the disk clamp 56. Next, according to step 130, the disk clamp 56 is attached to the spindle motor hub 48 with the plurality of disk clamp screws 58a–f. The screws 58a–f each includes a shaft 68 sized and configured to respectively engage the threaded disk clamp holes 62a–f respectively through the screw openings 60a–f. The screws 58a–f each further include a screw head 70 having a screw head clamping surface 72 disposed against the screw head interface surface 76. The screws 58a–f each further includes a surface coating 78 disposed upon the screw head clamping surface 72. The surface coating 78 has a static coefficient of friction less than a static coefficient of friction of the screw head 70 for mitigating relative movement between the disk clamp 56 and the axis of rotation 66 of the spindle motor 30. According to various embodiments, the various disk drive components may be as discussed as above.

We claim:

1. A disk drive comprising:
    a disk drive base;
    a rotatable disk including a disk surface;
    a spindle motor rotatably coupled to the disk drive base for rotating the disk about an axis of rotation, the spindle motor including a spindle motor hub including a clamping surface with a plurality of threaded disk clamp holes;
    a disk clamp disposed upon the disk surface about the spindle motor hub, the disk clamp including a screw head interface surface and a plurality of screw openings formed through the disk clamp; and
    a plurality of disk clamp screws, the screws each including a shaft sized and configured to respectively engage the threaded disk clamp holes respectively through the screw openings, the screws each further including a screw head having a screw head clamping surface disposed against the screw head interface surface, the screws each further including a solid surface coating disposed upon the screw head clamping surface, the surface coating having a static coefficient of friction less than a static coefficient of friction of the screw head for mitigating relative movement between the disk clamp and the axis of rotation of the spindle motor.

2. The disk drive of claim 1 wherein the surface coating includes a metallic material.

3. The disk drive of claim 1 wherein the metallic material includes polytetrafluoroethylene.

4. The disk drive of claim 2 wherein the metallic material includes nickel.

5. The disk drive of claim 1 wherein the surface coating includes a plastic material.

6. The disk drive of claim 1 wherein the surface coating is further disposed substantially about each of the disk clamp screws.

7. The disk drive of claim 1 wherein the surface coating has a static coefficient of friction less than 0.6.

8. The disk drive of claim 1 wherein the surface coating has a static coefficient of friction of about 0.2.

9. A method of mitigating disk shift relative to a spindle motor axis of rotation during assembly of a disk drive, the method comprising:
    a) providing a spindle motor having an axis of rotation, the spindle motor including a spindle motor hub including a clamping surface with a plurality of threaded disk clamp holes;
    b) mounting a disk about the spindle motor hub, the disk including a disk surface;
    c) mounting a disk clamp upon the disk surface about the spindle motor hub, the disk clamp including a screw head interface surface and a plurality of screw openings formed through the disk clamp; and
    d) attaching the disk clamp to the spindle motor hub with a plurality of disk clamp screws, the screws each including a shaft sized and configured to respectively engage the threaded disk clamp holes respectively through the screw openings, the screws each further including a screw head having a screw head clamping surface disposed against the screw head interface surface, the screws each further including a solid surface coating disposed upon the screw head clamping surface, the surface coating having a static coefficient of friction less than a static coefficient of friction of the screw head for mitigating relative movement between the disk clamp and the axis of rotation of the spindle motor.

10. The method of claim 9 wherein the surface coating includes a metallic material.

11. The method of claim 9 wherein the surface coating is polytetrafluoroethylene.

12. The method of claim 10 wherein the metallic material includes nickel.

13. The method of claim 9 wherein the surface coating includes a plastic material.

14. The method of claim 9 wherein the surface coating is further disposed substantially about each of the disk clamp screws.

15. The method of claim 9 wherein the surface coating has a static coefficient of friction less than 0.6.

16. The method of claim 9 wherein the surface coating has a static coefficient of friction of about 0.2.

* * * * *

UNITED STATES PATENT AND TRADEMARK OFFICE
CERTIFICATE OF CORRECTION

| | |
|---|---|
| PATENT NO. | : 7,057,852 B1 |
| APPLICATION NO. | : 10/286147 |
| DATED | : June 6, 2006 |
| INVENTOR(S) | : Walter W. Butler et al. |

It is certified that error appears in the above-identified patent and that said Letters Patent is hereby corrected as shown below:

Col. 6, Line 49: Delete "polyetrafluoroethylene" and insert --polytetrafluoroethylene-- therefor.

Signed and Sealed this

Second Day of January, 2007

JON W. DUDAS
*Director of the United States Patent and Trademark Office*